Nov. 7, 1944.  H. SWANSON  2,362,173
VEHICLE HEADLIGHT WITH ONE REMOVABLE FULL-BEAM ELECTRIC LAMP
Filed March 25, 1943  2 Sheets-Sheet 1

Witnesses:
Florence Hilston
Gustave W. Hilston

Inventor
Harold Swanson

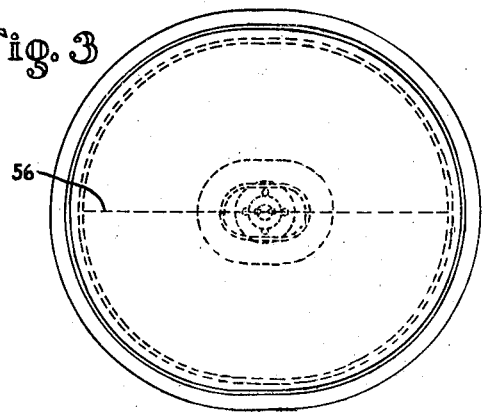
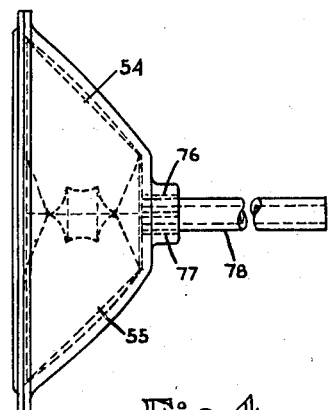
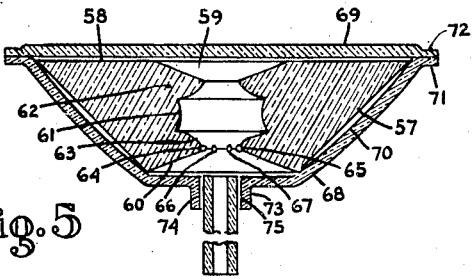
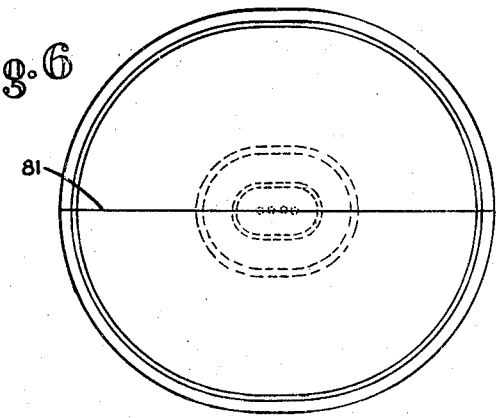
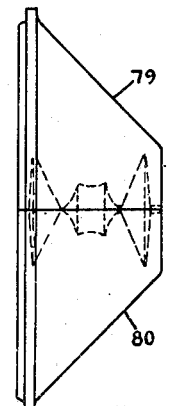
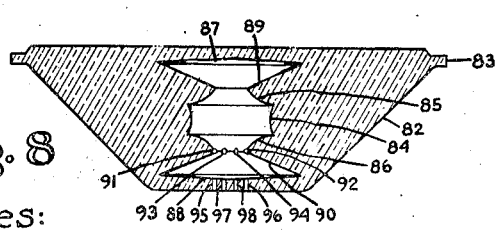

Patented Nov. 7, 1944

2,362,173

UNITED STATES PATENT OFFICE 2,362,173

VEHICLE HEADLIGHT WITH ONE REMOVABLE FULL-BEAM ELECTRIC LAMP

Harold Swanson, Brownhelm Township, Lorain County, Ohio

Application March 25, 1943, Serial No. 480,422

2 Claims. (Cl. 176—34)

This invention relates to improvements to increase the effective illumination produced by vehicle headlights and similar articles, but more particularly those electric lamps used in automobile headlights which uses focusing type electric lamps.

One object of this invention is to show a practical means of constructing a headlight electric lamp with optical elements that completely surround the lamp's light source and gathering such light produced into a concentrated beam which is projected by means of a headlight lens in a receptacle to the roadway for such vehicle.

A further object is that this application, together with my copending applications Serial Numbers 480,420; 480,421; 480,423; 480,424 and 480,425, filed March 25, 1943, is in part a continuation of my full-beam electric lamp application Serial Number 402,778, filed July 17, 1941, in which nearly an exact duplicated description of these inventions were originally presented. The feature which is generic to all these inventions, is the full-beam refracting element and its adaptation in construction, and operation to gather light in nearly all directions from a light source into a concentrated beam, as applied to electric lamps.

A further object is to show that certain improvements set forth in my original application Serial Number 744,598, filed Sept. 18, 1934, and subsequently continued through the following: Patent Number 2,097,679, patented Nov. 2, 1937, Patent Number 2,137,732, patented Nov. 22, 1938, Patent Number 2,154,542, patented April 18, 1939, Patent Number 2,222,093, patented Nov. 19, 1940, are adaptable to make vehicle headlight full-beam electric lamps and similar articles.

A further object is that this invention shall be a continuation of my earlier inventions mentioned in the preceding paragraph, in respect to where any improvements or subject matter of my earlier inventions can be used to advantage with the improvements of this invention, particularly the use of hollow metal wires and their many features which are described in the previous applications or patents and in this application.

A further object is that many features or improvements used in connection with my copending applications, previously referred to, can be used to advantage with this application, particularly the full-beam refracting elements and the many cross combinations possible by their substitution herein.

Other objects of this invention will appear more fully described and illustrated hereinafter.

Fig. 3 to Fig. 8 are elevational and sectional views of the full-beam refracting elements for a vehicle headlight full-beam electric lamp.

Figure 1:
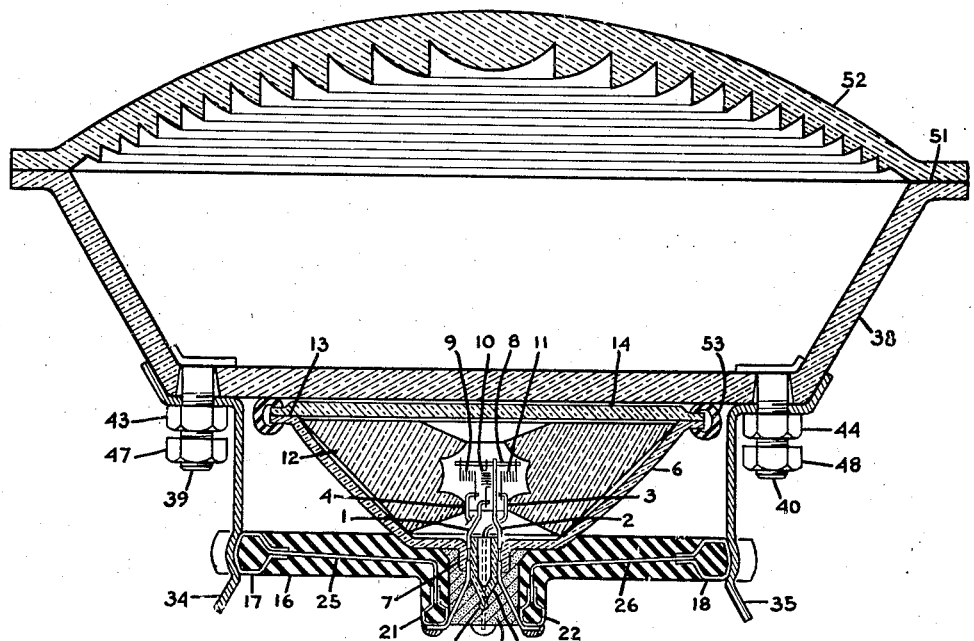
Fig. 1 is a sectional view of a full-beam electric lamp adapted to vehicle headlight use.
Figure 2:
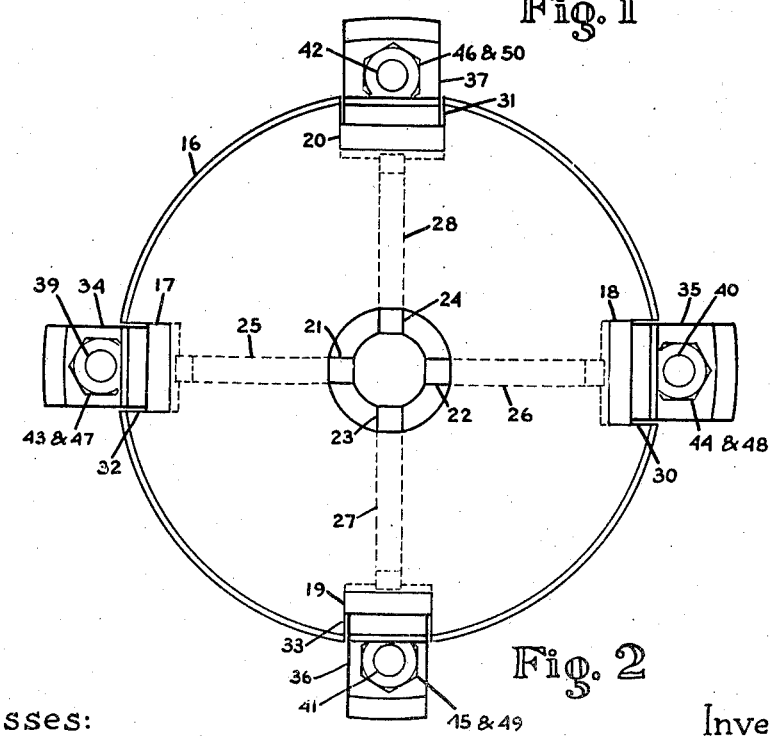
Fig. 2 is a detail view of the base of the device looking up.

Referring to Fig. 1 which is a sectional view and Fig. 2 a bottom view of a full-beam electric lamp adapted to automobile headlight use; having four regular three-piece electric lamp lead-in wires 1, 2, 3, and 4 (only the inner end of lead-in wire 4 is shown), a glass exhaust tube 5, and the outer glass bowl 6 (see Fig. 3 to Fig. 5 for details), all hermetically sealed together by glass fusion, with heat applied all around the bowl neck 7; a lead-in wire terminal 8 is spot-welded to the inner end of lead-in wire 2, and the ends of three coiled electric lamp filaments 9, 10, and 11 each designed respectively for, a near or passing beam, a far or rural driving beam, and a parking or twilight driving beam, which are positioned and spot-welded together with the inner ends of the other lead-in wires 1, 3, and 4, and the terminal 8; two halves of the full-beam refracting element 12 (see Fig. 3 to Fig. 5 for details) being made from heat resisting glass (only the rear half of element 12 is shown here), are set into the bowl 6 enclosing the filaments 9, 10, and 11; the upper flanged brim of the bowl 6 is coated with a film of suitable glass fusing material all around at 13 and (or without coating if desired) hermetically sealed by glass fusion with the glass bowl cover 14 at 13; then the lamp is exhausted to a vacuum, or exhausted and filled with an inert gas, at low pressures, through the contracted glass exhaust tube 5 which is heated and tipped off at 15; a lamp base 16 made from any suitable moulded plastic, having the embedded sheet brass or copper outer contacts 17, 18, 19, and 20, and the inner contacts 21, 22, 23, and 24 which are joined together in sets respectively with connectors 25, 26, 27, and 28, all being previously formed and moulded in place as shown (the contacts and connectors in each set can be made from one piece of metal if desired); the ends of the lead-in wires 1, 2, 3, and 4 are soldered to the inner contacts 21, 22, 23, and 24 respectively as shown, after the base 16 is positioned on the lamp and cemented together with a suitable basing cement 29; the lamp base 16 is provided with wide contact slots 30 and 31, and narrow contact slots 32 and 33 that will just freely fit the contact socket clips 34, 35, 36, and 37 respectively as shown and prevent the improper socket insertion of the lamp; a glass receptacle or automobile headlight bowl 38 of circular cross-section as shown, having four holes into which are cemented, with rubber cement or any other suitable cement, four brass socket clip screws 39, 40, 41, and 42, each formed with a thin flanged head as shown, and fitted with the brass hex. nuts 43, 44, 45, 46, 47, 48, 49, and 50 respectively; the contact socket clips 34, 35, 36, and 37, are made from sheet spring bronze, being formed and perforated as shown, and their under surfaces are coated with a film of rubber cement, or any other suitable cement, to act as a gasket in contact with the glass bowl 38; the upper flanged brim of the bowl 38 is coated with a film of suitable cement, or glass fusing material, all around at 51 and (or without coating if desired) hermetically sealed by glass fusion, or cemented with the glass headlight lens 52 at 51; the soft rubber dust ring 53 is stretched around the flange of the bowl 6 and cover 14; then the lamp is forced into the spring socket clips 34, 35, 36, and 37, with the dust ring 53 pressing against the bottom of the bowl 38; the extra hex. nuts 47, 48, 49, and 50 are provided for connecting with the electric supply lines.

In Fig. 1 and Fig. 2, the base 16 can be designed in two parts with a large outer part and a small inner part. The small inner part being cemented to the lamp and then bayonet socket fitted into the large outer part. This arrangement of two parts would provide a small convenient base cemented to the lamp and the large outer part would be a socket adaptor; then when a new lamp replaces an old one, the old adaptor could be used again if still serviceable.

In Fig. 1 the lead-in wires can be made from hollow metal wires which are used to exhaust, or exhaust and fill the lamp with an inert gas at either low or high pressures, up to a safe working pressure, and finally seal the lamp by closing the outer ends of the hollow metal wires air tight; in which case the glass exhaust tube 5 is eliminated.

In Fig. 3 to Fig. 8, the details are generally symmetrical about their center lines, and for convenience, so as not to crowd the numbers, I have shown the numbers designating details of either half indiscriminately, and in only one view.

In Fig. 3 to Fig. 8, each part is shown by three views in third-angle orthographic projection, a plan or top elevation, a side elevation, and the lower one being a center sectional view.

Referring to Fig. 3 to Fig. 5 collectively which shows the refracting elements and enclosing bowl for a headlight full-beam electric lamp; having two half full-beam refracting elements 54 and 55 being made from heat resisting glass and fitting together on their center line junction surfaces at 56; each element 54 or 55 having an elongated semi-cone frustum body whose flanks form a 90° (approximate) prism light reflecting surface at 57, and a flat surface at 58; each element 54 or 55 having two elongated semi-cones at 59 and 60 whose flanks form 120° (approximate) prism light reflecting surfaces for light-rays radiating from the center line of the light source chamber; each element 54 or 55 having a light source chamber which is formed by elongated semi-circular ring surfaces at 61 shaped to a convex lens cross-section, with elongated semi-cone surfaces at 62 and 63 whose flanks are shaped to a convex lens cross-section; lead-in wire grooves are formed at 64, 65, 66, and 67; an elongated glass bowl 68 and an oval glass cover plate 69 are made to just enclose the elements 54 and 55; bowl 68 being an elongated cone frustum bowl whose inside flanks at 70 are slightly curved outward so as to be free from contact with the light reflecting surface at 57, except at the top and bottom rims of elements 54 and 55; bowl 68 having a flanged brim at 71 which fits the thin edge or flange at 72 of the cover plate 69; bowl 68 having a hub at 73 with a hole for the glass exhaust tube 78 and lead-in wire grooves at 74, 75, 76, and 77. Elements 54 and 55 are constructed around the polar axis.

Referring to Fig. 6 to Fig. 8 collectively which show the refracting elements for a headlight full-beam electric lamp; having two half full-beam refracting elements 79 and 80 being made from heat resisting glass and fitting together on their center line junction surfaces at 81; each element 79 or 80 having an elongated semi-cone frustum body whose flanks form a 90° (approximate) prism light reflecting surface at 82 with the upper and bottom faces being flat and having a thin flange at 83 around the top; each element 79 or 80 having a light source chamber which is formed by elongated semi-circular ring surfaces at 84 shaped to a convex lens cross-section, with elongated semi-cone surfaces at 85 and 86 whose flanks are shaped to a convex lens cross-section; each element 79 or 80 having two recessed chambers formed by elongated shallow semi-cone surfaces at 87 and 88, and elongated semi-cone surfaces at 89 and 90 whose flanks form 120° (approximate) prism light reflecting surfaces for light-rays radiating from the center line of the light source chamber; lead-in wire grooves are formed at 91, 92, 93, 94, 95, 96, 97, and 98. Elements 79 and 80 are are constructed around the polar axis.

The elements shown in Fig. 6 to Fig. 8, can be made into a lamp similar to Fig. 1 without the enclosing bowl 68 and cover 69 by coating the junction surfaces at 81 of the elements 79 and 80 with a thin film of suitable glass fusing material, and after positioning the lamp filaments mounted on hollow metal wire leads in place, they are hermetically sealed together by glass fusion; then the lamp is exhausted to a vacuum, or exhausted and filled with an inert gas through the hollow metal wires whose outer ends are closed air tight to seal the lamp.

While I have not shown light propagation diagrams of the full-beam refracting elements shown and described herein, yet diagrams of them could be easily approximated after studying the diagrams in my copending applications, previously referred to, Serial Numbers 480,423; 480,424 and 480,425, with the full-beam refracting elements that they represent.

Whenever the words "refracting element" or "full-beam refracting element" or "outer full-beam refracting element" or the plural "elements" in place of "element" with said words, are used herein, they are intended to mean the refracting elements shown and described herein, or in my copending application Serial Numbers 480,420; 480,421; 480,423; 480,424 and 480,425, or any full-beam refracting element which is made with any improvement or feature described herein or therein.

Whenever the words "hollow metal wire" or "high pressure gas" or "hermetically sealed" or "final seal" are used herein, they are intended to have the same meaning as described in one or more of the previously mentioned patents (2,097,679; 2,137,732; 2,154,542; 2,222,093) from which this invention is a continuation.

Whenever the words "convex lens" or "convex lens shape" or "convex lens cross-section" are used herein to describe a curve or surface, they are intended to mean that such curve or surface has a form which resembles a convex lens or a convex lens curve; or any type of lens curve or surface which is corrected optically for spherical and chromatic aberration; or any type of curve or surface which will refract light-rays.

Light diagrams would show here that the best results are obtained by using a small light source, therefore it is advisable to keep the distance between the filaments 9, 10, and 11, in Fig. 1, as small as is practical.

In Fig. 1, it is obvious that the headlight lens 52 could be made of any design desired, such as any one of those designs shown with the headlights in my copending applications Serial Numbers 480,421 and 480,423, or any other type used on present headlights which will adapt itself to this headlight with slight modifications. Past experience has shown that it is best to use a headlight lens having a smooth outer surface on account of being easier to keep clean by washing or rubbing off dirt deposits when necessary.

The bowl 38, in Fig. 1, can be made from any suitable transparent moulded plastic, or from opaque moulded plastic or metal when a window is provided on the diameter at the rubber dust ring 53.

The binding post screws 39, 40, 41, and 42, in Fig. 1, are purposely made larger than ordinarily required so that heavy terminal wires can be connected thereto, which will support the receptacle (bowl 38 and lens 52) when the outer holding ring (not shown) is removed from the vehicle, in a dangling position; also the heavy wires will prevent the headlight from falling to the roadway if the outer holding ring accidentally comes off while the vehicle is in motion.

The large lamp base 16, in Fig. 1, provides ample hand and finger space between the clips 34, 35, 36, and 37 for removing without tools; also a wiping action is made on the contacts when inserting the lamp.

In view of the drawings and preceding description, it is obvious that the improvements of this invention can be used to make many more vehicle headlight lamps, which can be mounted from the rear face of a headlight lens receptacle as shown herein, other than those shown or described; therefore in anticipation of the manufacture of such lamps or receptacles, it is a further object of this invention to extend the claims to include any electric lamp or headlight lens receptacle which uses one or more of the improvements described or claimed herein.

I claim:

1. A vehicle headlight full-beam electric lamp, consisting of, a light source, leads connecting to said light source, a full-beam refracting element of light transmitting material having a chamber enclosing said light source, said element made in half sections affording means to assemble said light source and leads therein, said element having a beveled light reflecting surface encircling its outside, said chamber formed of lens and prism sections, said sections arranged to gather light-rays in nearly all directions from said light source and projecting the same to said outside reflecting surface thence in predetermined directions 2. A vehicle headlight, consisting of, a full-beam electric lamp, said lamp including a refracting element and a flat transparent cover sealed thereto, a bowl shaped transparent flat bottom receptacle and a headlight lens cover attached thereto, said receptacle having several flexible electrical contact clips mounted thereon for holding said lamp in focusing alignment with said lens and with the transparent flat cover thereof pressed against the flat bottom of the receptacle and affording electrical contact and flexible means to insert or remove said lamp therewith, the light rays from said lamp being projected through the bottom of said receptacle and thence through said lens in predetermined directions.

HAROLD SWANSON.